Figure 1:
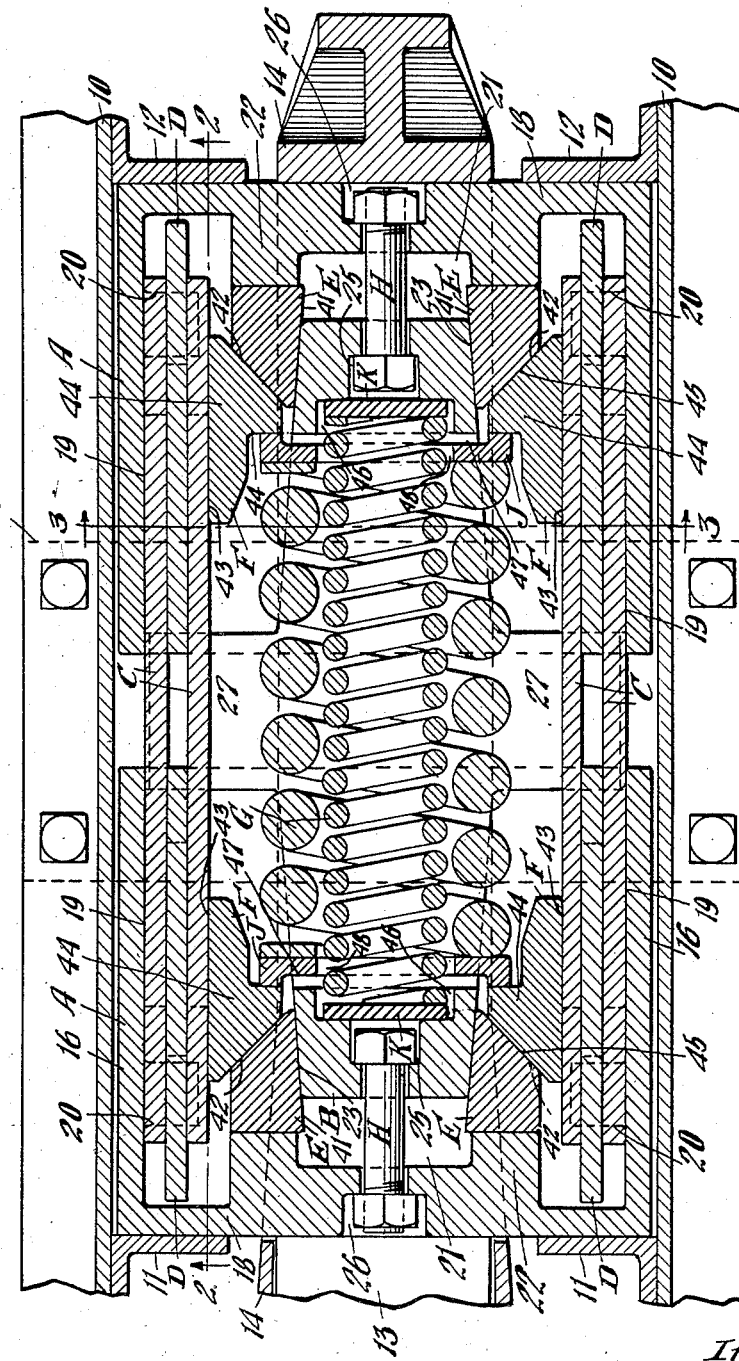

June 10, 1930.  J. F. O'CONNOR  1,762,415
FRICTION SHOCK ABSORBING MECHANISM
Filed Dec. 31, 1927   2 Sheets-Sheet 2
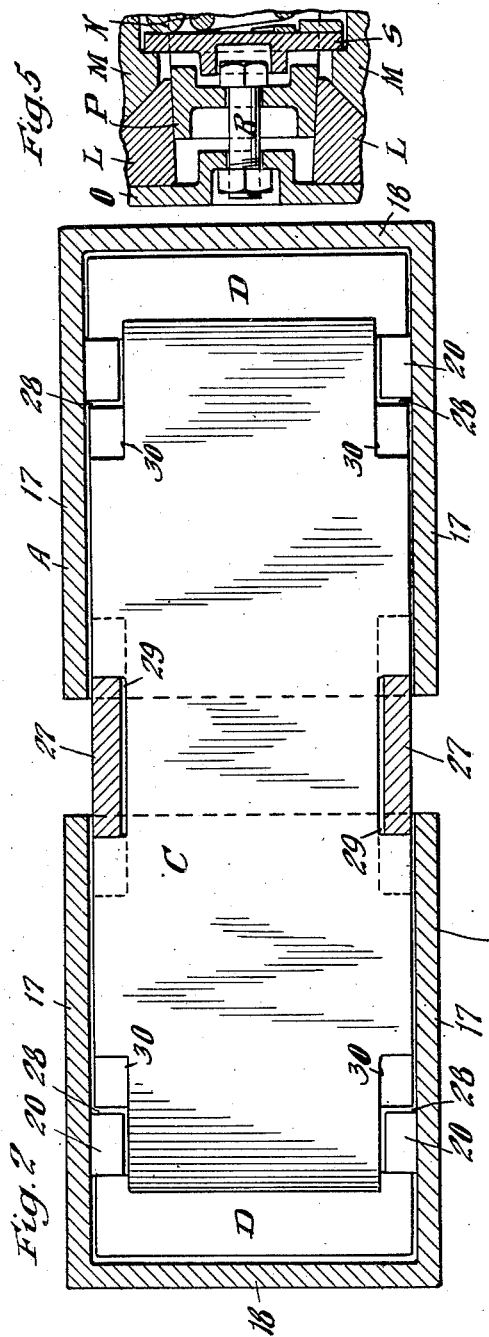
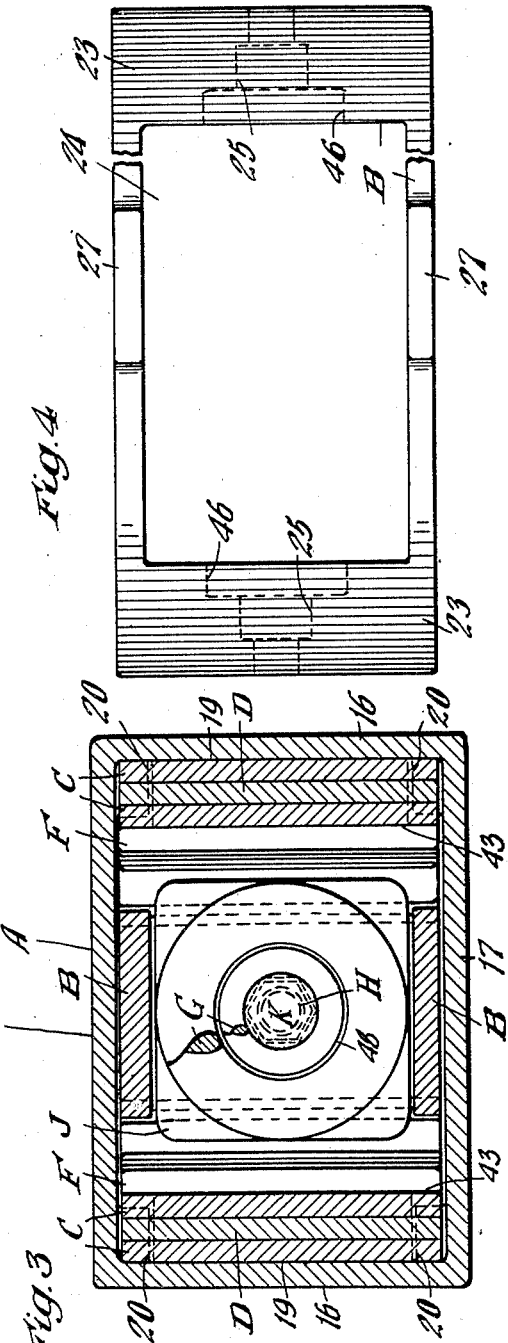
Inventor
John F. O'Connor
By George L. Haight
His Atty
Witness
Wm. Geiger Patented June 10, 1930

1,762,415

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed December 31, 1927. Serial No. 243,915.

This invention relates to improvements in friction shock absorbing mechanisms.

One object of the invention is to provide a friction shock absorbing mechanism more particularly adapted for railway draft riggings, of the intercalated-plate type, having high capacity and differential wedge action, wherein quick and positive release of the parts is assured.

A more specific object of the invention is to provide a shock absorbing mechanism of the character indicated, of the double-ended type, including a central floating member, to which are fixed a plurality of plates, movable plates co-operating with the fixed plates, front and rear friction shells co-operating with the friction plates, and wedge-acting means co-operating with the plates, wherein the wedge means and central member co-operate to provide differential action.

Other and further objects of the invention will more clearly appear from the description and claims hereinafter following.

In the drawings, forming a part of this specification, Figure 1 is a horizontal, longitudinal, sectional view of a portion of a railway draft rigging, showing my improvements in connection therewith. Figure 2 is a longitudinal, vertical, sectional view of the shock absorbing mechanism proper, corresponding substantially to the line 2—2 of Figure 1. Figure 3 is a vertical, transverse, sectional view, corresponding substantially to the line 3—3 of Figure 1. Figure 4 is a side elevational view of the central friction member employed in connection with my improved shock absorbing mechanism. And Figure 5 is a horizontal, sectional view of a portion of one end of an improved shock absorbing mechanism, illustrating a different embodiment of the invention than that shown in Figures 1 to 4, inclusive.

In said drawings, 10—10 indicate channel-shaped center or draft sills of a railway car underframe, to the inner sides of which are secured the usual front stop lugs 11—11 and rear stop lugs 12—12. The inner end of the drawbar is designated by 13, to which is operatively connected a yoke 14 of well known form. My improved shock absorbing mechanism is disposed within the yoke, and the yoke in turn is supported in operative position by a detachable saddle plate 15 secured to the draft sills.

Referring first to the embodiment of the invention illustrated in Figure 1 to 4, inclusive, my improved shock absorbing mechanism comprises broadly front and rear combined followers and friction shells A—A; a central tapered floating column B; a plurality of fixed friction plates C—C; a plurality of movable friction plates D—D; front and rear sets of wedge blocks E—E and E—E; front and rear sets of friction shoes F—F and F—F; a main spring resistance G; front and rear retainer bolts H—H; spring followers J—J; and spring follower discs K—K.

The front and rear combined friction shell and follower members are of similar design, each being in the form of a substantially rectangular box-like member, having longitudinally disposed, spaced side walls 16—16, horizontally disposed, spaced top and bottom walls 17—17, and a vertically disposed, transverse outer end wall 18. The side walls 16 present interior, longitudinally disposed, friction surfaces 19—19, which are adapted to co-operate with the adjacent friction plates C. Adjacent the outer end of each shell, the top and bottom walls thereof are provided with relatively short interior lugs 20—20, which form anchoring means for certain of the friction plates, as hereinafter more clearly pointed out. The central portions of the end walls are thickened, as most clearly shown in Figure 1, the thickened portion being centrally cut away, as indicated at 21, thereby leaving relatively short inwardly extending abutment members 22—22 on each shell, adapted to co-operate with the wedge blocks E—E at the corresponding end of the mechanism.

The column B is disposed between the friction shells or casings and along the central axis of the mechanism. As shown in Figures 1 and 4, the column B is tapered at opposite ends, thereby presenting outwardly converging opposed friction surfaces 23—23 at each end, which are adapted to co-operate with the friction shoes at the opposite ends of the mechanism. The central portion of the column is cut away, as most clearly shown in Figure 4, thereby leaving an opening 24, within which the spring resistance element of the mechanism is accommodated. The column member B is anchored to the respective friction shells by means of the front and rear bolts H. As shown, the bolts H have their heads seated in recesses 25 at the opposite ends thereof, the nuts of the bolts being accommodated in recesses 26 provided in the end walls 18 of the friction casings A. The bolts H are so adjusted that the column will be centered between the friction shells or casings A in the full release position of the mechanism, and, further, that the overall length of the mechanism will be maintained uniform, the column acting as an anchoring connecting means in conjunction with the two bolts H, for effecting the last named result. The column B is also provided with top and bottom laterally projecting arms 27—27 at the opposite sides thereof. As clearly illustrated in Figures 1, 2 and 4, the arms 27 are disposed midway between the ends of the column B.

The friction plates C and D are arranged in groups at opposite sides of the mechanism, each group, as shown, comprising two long friction plates C and two relatively shorter friction plates D, which are disposed between the two plates C. The friction plates D of each set are anchored respectively to the front and rear friction shells for movement therewith. As shown, each of these plates D is provided with top and bottom aligned notches 28—28, which receive the top and bottom lugs 20—20 of the corresponding friction shell. The lugs 20 and notches 28 are so proportioned that there will be slight relative movement between the plates D and the friction shells upon inward movement of the latter, clearance being left between the end walls of the notches and the lugs 20 for this purpose. As shown in Figure 2, the arrangement is such that when the lugs 20 engage the outer end walls of the notches 28 of the plates D, the latter will have their outer ends slightly spaced from the corresponding end wall of the casing or shell A. It will also be noted that the inner end walls of the notches 28 are spaced a similar distance from the corresponding ends of the lugs 20 of said casing. The plates D are preferably made of such a length that the inner ends of the same coincide with the inner end of the corresponding casing A. The two friction plates C of each group, which, as hereinbefore pointed out, are disposed on opposite sides of the plates D of each group, are held against movement with respect to the column B. In order to thus anchor the friction plates C of each group, each plate C is provided with top and bottom recesses 29—29, which are adapted to receive the corresponding top and bottom arms 27 of the column member B. As shown in Figures 1 and 3, the arms 27 at each side of the column B serve to anchor the two plates C of the group at the corresponding side of the mechanism. Sufficient looseness is permitted between the arms 27 and the walls of the openings 29 of the plates C, to allow lateral displacement of the plates without permitting longitudinal movement thereof with respect to the column B. As shown in Figure 2, the opposite ends of the plates C are cut away at the top and bottom edges thereof, as indicated at 30—30, so as to clear the lugs 20 of the friction casings or shells at the opposite ends of the mechanism, to allow relative approach of the shells or casings to the extent of the full compression stroke of the mechanism. As clearly illustrated in Figure 2, the plates D are cut away centrally at the top and bottom edges to provide clearance for the arms 27 to permit the required movement between the parts during the full compression stroke of the mechanism.

The wedge blocks E are arranged in sets at opposite ends of the mechanism, each set comprising two wedge blocks. The wedge blocks E of each set are disposed at opposite sides of the column B and are provided with longitudinally disposed friction surfaces 41—41 on the inner sides thereof, adapted to co-operate with the friction surfaces 23 at the corresponding end of the column B. At the outer ends, the wedge blocks E are provided with flat abutment faces bearing directly on the abutment members 22 of the corresponding casing A. On the outer side, each wedge block E is provided with a wedge face 42, adapted to co-operate with the corresponding friction shoe F.

The friction shoes F are also arranged in sets at opposite ends of the mechanism, each set comprising two shoes. Each shoe F is interposed between one of the wedge blocks E at the same end of the mechanism and the innermost of the friction plates C of one of said groups. On the outer side, the shoe F is provided with a longitudinally disposed flat friction surface 43, adapted to slide on the inner surface of the co-operating plate C. On the inner side of the friction shoe F, is provided an enlargement 44, having an outer wedge face 45 which co-operates with the wedge face 42 of the wedge block E.

The spring resistance G comprises an inner light coil and an outer heavier coil. The inner coil has the opposite ends thereof bearing on the spring follower discs K, which are disposed within pockets or recesses 46—46 at the opposite ends of the column B. The outer heavier spring has the opposite ends thereof bearing on the spring followers J at the opposite ends of the mechanism. As shown, the spring followers J are in the form of relatively heavy plates and are cut away centrally, as indicated at 47, to clear the corresponding end section of the column B. Each spring follower plate J is also provided with a central opening 48, through which the corresponding end of the inner coil of the spring extends, the opening 48 being larger in diameter than the coil of the inner spring, so that the spring follower has free movement with respect to said spring. As shown in Figure 1, the spring followers J bear directly on the enlargements of the friction shoes F at the same end of the mechanism, whereby the outer coil of the spring resistance directly opposes movement of the friction shoes of the front and rear sets toward each other.

The operation of my improved shock absorbing mechanism, assuming a compression stroke, is as follows: The front and rear friction casings or shells will be moved toward each other, thereby forcing the wedge blocks E of the front and rear sets inwardly toward each other and setting up a wedging action between these members and the friction shoes E. The shoes will thus be forced apart, placing the two groups of friction plates under a lateral pressure and compressing the same between the shoes and the side walls of the casings or shells A. During the inward movement of the shells A, with respect to each other, the wedge blocks E will be forced to slide along the friction surfaces 23 of the central column member B, and the shoes will be forced inwardly on the friction surfaces of the innermost friction plates C of the two groups. The relative approach of the front and rear sets of friction shoes F is directly opposed by the outer coil of the spring resistance G. Inasmuch as the outer ends of the friction plates D are initially slightly spaced from the corresponding end walls of the front and rear casings A, the plates D will not be actuated at the initiation of the compression stroke, but will be engaged by the end walls of the casings when the clearance has been taken up and forced inwardly with the casings or shells. Inasmuch as the two innermost plates C are anchored to the central column B by the arms 27, the plates C will be maintained substantially fixed during the entire compression stroke of the mechanism. The plates D will thus be forced to slide relatively to the plates C, thereby producing high frictional resistance. It is further pointed out that a differential wedging action will also be effected, due to the opposite ends of the column B being tapered. On account of this tapering arrangement, the wedge blocks E will be forced apart laterally during the inward movement on the surfaces 23 of the column B, thereby effecting slippage between the co-operating wedge faces of the wedge blocks and the friction shoes F. This differential action of the wedge faces will cause an additional inward movement of the friction shoes F, thereby further compressing the spring resistance. The inner coil of the spring resistance G will not be compressed until the retainer bolts H are brought into action, either by the engagement of the outer end of the front bolt by the drawbar, or engagement of the rear end of the rear bolt by the yoke member.

During release of the mechanism, upon the actuating force being reduced, the expansive action of the spring resistance G will force the friction shoes F outwardly, carrying the wedge blocks E and the casings A therewith. Due to the clearance provided between the lugs 20 of the casings A and the notches 28 of the plates D, the casings A will be permitted to move outwardly with respect to the friction plates during the first part of the releasing action, without effecting any substantial movement of the plates. It will be evident that the releasing action of the mechanism is thus greatly facilitated. After the clearance between the lugs and the walls of the notches 28 has been taken up, the friction plates C of the respective casings A will be carried outwardly in unison with these casings, thereby effecting restoration of the parts to the normal position illustrated in Figure 1. The expansive action of the inner coil of the spring resistance will tend to force the bolts H outwardly. The releasing action described will continue until outward movement of the front and rear casings A is limited by the retainer bolts H, which, as hereinbefore pointed out, are anchored to the opposite ends of the central column B.

During the compression of the mechanism, relative approach of the front and rear casings A will be positively limited by engagement of these casings with each other, the casings thus acting as solid column load transmitting members to transmit the actuating force directly from the drawbar or the yoke, through the casings, to the stop lugs on the draft sills, thereby preventing the spring resistance G from being unduly compressed.

Referring to the embodiment of the invention illustrated in Figure 5, it is pointed out that all of the mechanism, with the exception of the arrangement of the spring resistance, is identical with that shown in Figures 1 to 4, inclusive. In this figure, the wedge blocks are designated by L—L, the friction shoes by M—M the spring resistance by N—N, the follower casing by O, the central column by P, the retainer bolt by R, and the spring follower by S. As shown in this form, the wedge blocks L bear directly on the end wall of the casing, and the spring follower S bears directly on the enlargements of the friction shoes M, and both of the coils of the spring resistance N bear on the spring follower. It will be evident that the movement of the friction shoes at the front and rear ends of the mechanism is thus directly resisted by both coils of the spring resistance. The casings O are anchored to the column P in a manner similar to that shown in Figures 1 to 4, inclusive, the retainer bolt R at each end of the mechanism having its head anchored to the column, and the nut thereof anchored to the corresponding casing O.

The operation of the improved shock absorbing mechanism, as illustrated in the embodiment shown in Figure 5, is substantially the same as that hereinbefore described, with the exception that the two coils of the spring resistance together oppose movement of the friction shoes directly, whereby additional resistance to movement of the parts is offered.

While I have herein shown and described what I consider the preferred manner of carrying out the invention, the same is merely illustrative, and I contemplate all changes and modifications which come within the scope of the claims appended hereto.

I claim:

1. In a friction shock absorbing mechanism, the combination with front and rear followers relatively movable toward each each other; of a central column element relatively to which said followers are movable; means carried by said followers for centering the column between the followers upon separation thereof; friction plates disposed at opposite sides of the mechanism, said plates being anchored to the column element against longitudinal movement relative to said column; additional friction plates co-operating with said first named friction plates, said additional friction plates comprising two sets, movable respectively with said front and rear followers; means for opposing lateral outward movement of said plates; wedge means co-operating with each of said followers and movable inwardly therewith; friction shoes co-operating with the plates and engaged by said wedge members and moved lengthwise of the mechanism thereby; and spring resistance means opposing movement of said friction shoes.

2. In a friction shock absorbing mechanism, the combination with a central floating column element; of front and rear sets of wedge blocks having sliding frictional contact with said column element; front and rear follower casings movable towards and away from each other and co-operating with said wedge members for forcing the same inwardly toward each other during relative approach of said casings; friction shoes co-operating with said wedge members; friction plates interposed between the friction shoes and the side walls of the casings, certain of said plates being anchored to the column member against movement longitudinally of said column, and the remaining plates comprising two sets, movable respectively with said casings; and spring resistance means opposing relative approach of the front and rear sets of friction shoes; and means connecting said followers and column for centering the latter between the followers upon separation thereof, said last named means also limiting the relative separation of the followers.

3. In a friction shock absorbing mechanism, the combination with front and rear follower casings movable toward and away from each other, the side walls of said casings being provided with interior friction surfaces; of a central column element interposed between said casings, wedge blocks at opposite sides of said column and arranged in front and rear sets movable with the respective casings; friction shoes arranged in sets at opposite ends of the mechanism and co-operating with the front and rear sets of wedge blocks; two groups of friction plates disposed at opposite sides of the mechanism, each group comprising a plurality of plates anchored to the column and held against longitudinal movement with respect to said column member, and front and rear relatively short friction plates co-operating with said fixed plates, said short plates being movable with respect to the fixed plates; spring resistance means opposing relative movement of the friction shoes toward each other; and means anchored to said followers and opposite ends of the column for limiting relative separation of the followers and centering said column with respect to the followers.

4. In a friction shock absorbing mechanism, the combination with front and rear friction casings relatively movable toward each other, each of said casings being provided with opposed interior friction surfaces; of a central carrier member; means for centering the carrier member between said casings, including members anchored to the opposite ends of said carrier member and the front and rear casings, respectively; two groups of friction plates disposed at opposite sides of the mechanism, each group comprising relatively short plates anchored to the front and rear casings movable therewith, and additional plates cooperating with the short plates and also cooperating with the friction surfaces of the casings, said last named plates being anchored to the carrier against movement longitudinally of the same; means actuated upon relative approach of the follower casings for placing the plates of both groups under lateral pressure; and spring resistance means cooperating with said last named means and opposing relative approach of the follower casings.

5. In a friction shock absorbing mechanism, the combination with front and rear relatively movable follower elements; of a plurality of intercalated friction plates arranged lengthwise of the mechanism, including plates movable with said followers, respectively, and additional plates with respect to which said first named plates are movable;

a column element; and means on said column engaging said additional plates to hold the same against longitudinal movement with respect to the column; means for placing all of said plates under lateral pressure, including friction wedge means at the opposite ends of the mechanism, said wedge friction means being actuated by relative approach of the follower elements; anchoring means connecting the follower elements and said column and having shouldered engagement therewith, to limit outward movement of said follower elements, center said column between the followers and maintain the overall length of the mechanism; and spring resistance means yieldingly opposing movement of said friction wedge means.

6. In a friction shock absorbing mechanism, the combination with front and rear follower casings, having opposed interior friction surfaces; of two groups of friction plates at opposite sides of the mechanism co-operating with the friction surfaces of said casings; a central column member; friction wedge blocks at opposite ends of the mechanism, co-operating with said column member and movable by engagement with said follower casings; friction shoes interposed between the wedge blocks and the friction plates; retainer bolts anchored to the front and rear casings and the central column member, said bolts being movable with respect to the central column member; and a main spring resistance comprising an outer coil opposing relative movement of the friction shoes and an inner coil opposing inward movement of the retainer bolts.

7. In a friction shock absorbing mechanism, the combination with front and rear followers; of a carrier interposed between said followers; means cooperating with said followers and actuated thereby upon outward movement thereof for centering the carrier between said followers; relatively movable friction plates at opposite sides of the mechanism, certain of said plates being fixed to the carrier against longitudinal movement with respect thereto, the remaining plates comprising two sets movable with said followers respectively by engagement therewith; means for placing all of said plates under lateral pressure, including spreading means actuated by said followers upon relative approach thereof; and spring resistance means opposing movement of said lateral pressure means.

In witness that I claim the foregoing I have hereunto subscribed my name this 29th day of December, 1927.

JOHN F. O'CONNOR.